ium-activated calcium sulfide phosphor is sensi-
United States Patent
Lehmann

[11] 3,898,174
[45] Aug. 5, 1975

[54] CERIUM-ACTIVATED CALCIUM SULFIDE PHOSPHOR WHICH IS SENSITIZED TO RESPOND BOTH TO SHORT WAVELENGTH AND LONG WAVELENGTH ULTRAVIOLET EXCITATION

[75] Inventor: Willi Lehmann, Murrysville, Pa.

[73] Assignee: Westinghouse Electric Corporation, Pittsburgh, Pa.

[22] Filed: Aug. 27, 1973

[21] Appl. No.: 391,918

[52] U.S. Cl. .................................... 252/301.4 S
[51] Int. Cl.² ............... C09K 11/12; C09K 11/14; C09K 11/18; C09K 11/24; C09K 11/34; C09K 11/46
[58] Field of Search ....................... 252/301.4 S

[56] References Cited
UNITED STATES PATENTS

| | | |
|---|---|---|
| 2,485,903 | 10/1949 | Miller ............................ 252/301.4 S |
| 2,522,074 | 9/1950 | Urbach ............................ 252/301.4 S |
| 3,673,102 | 6/1972 | Lehman et al. .................. 252/301.4 S |
| 3,742,277 | 6/1973 | Peters ..................... 252/301.4 S X |

*Primary Examiner*—Jack Cooper
*Attorney, Agent, or Firm*—W. D. Palmer

[57] ABSTRACT

Cerium-activated calcium sulfide phosphor is sensitized to respond to long wavelength ultraviolet excitation as well as short wavelength ultraviolet excitation by incorporating therein a sensitizer of stannous tin, plumbous lead or cuprous copper. A bromine or chlorine coactivator is needed with the lead sensitizer. A fluorine or chlorine coactivator is needed with the tin sensitizer, and a fluorine coactivator is needed with the copper sensitizer. The coactivator is included in the phosphor raw mix as a salt which is free from any alkali metal.

2 Claims, No Drawings

3,898,174

CERIUM-ACTIVATED CALCIUM SULFIDE PHOSPHOR WHICH IS SENSITIZED TO RESPOND BOTH TO SHORT WAVELENGTH AND LONG WAVELENGTH ULTRAVIOLET EXCITATION

BACKGROUND OF THE INVENTION

Cathodoluminescent calcium sulfide activated by trivalent cerium is disclosed by W. Lehmann, the applicant herein, and F. M. Ryan in Journal of the Electrochemical Society, Volume 11, No. 3, pages 477–482 (March 1971). The phosphor described in the foregoing publication is also described in copending patent application Ser. No. 128,328, filed Mar. 26, 1971, entitled "Cathodoluminescent Calcium Sulfide Phosphors" by W. Lehmann and F. M. Ryan, and owned by the present assignee, now abandoned.

The foregoing phosphor responds excellently to excitation by cathode rays and it also responds very well to excitation by short wavelength ultraviolet, such as the 254 nm resonant radiations of a low-pressure fluorescent mercury lamp. The phosphor is essentially non-responsive to long wavelength ultraviolet excitation, such as the 365 nm radiations which are produced by a high-pressure mercury-vapor discharge, because of the absence of optical absorption by the phosphor in this spectral range.

Alkaline earth sulfide phosphors which are doubly activated for purposes of infrared radiation stimulation are disclosed in U.S. Pat. No. 2,522,074, dated Sept. 12, 1950 to F. Urbach. Such phosphors are prepared by firing with a fluxing material such as lithium fluoride. Even though the double activators for these phosphors include cerium, copper and tin, the presence of alkali metal halide flux in the raw mix will severely impair the performance of the phosphor for excitation by ultraviolet.

SUMMARY OF THE INVENTION

There is provided a phosphor composition which is responsive both to short wavelength and long wavelength ultraviolet excitation to produce visible radiations. The phosphor has a calcium sulfide matrix and is activated by trivalent cerium. It is necessary to include with the phosphor both a selected sensitizer and coactivator. The coactivator is restricted in choice since both the cerium activator and the sensitizer are required to be incorporated into the phosphor matrix, and the coactivators which make this possible should not interfere with one another. In accordance with these requirements, the phosphor is both sensitized and coactivated by one of the combination of: (1) cuprous copper sensitizer plus fluorine coactivator, or (2) stannous tin sensitizer plus at least one of fluorine and chlorine as coactivator, or (3) plumbous lead sensitizer plus at least one of chlorine and bromine as coactivator. The coactivator is present in the phosphor in gram-atom amount which is at least equal to the total gram-atoms of cerium activator plus sensitizer. It is also important to include the coactivator in the raw mix which is used to prepare the phosphor as a salt which is free from any alkali metal.

DESCRIPTION OF THE PREFERRED EMBODIMENTS

In preparing the phosphor, finely divided phosphor grade calcium sulfide is mixed with finely divided cerium sulfide along with the sensitizer which is preferably introduced as the sulfide and the coactivator which is introduced as a salt. The coactivator should not be included in the raw mix as an alkali metal salt. As indicated hereinbefore, a coactivator is required in order to cause the activator and sensitizer both to be incorporated into the phosphor. This in effect imposes the requirement that the coactivator serve a double function, namely, to cause the cerium to be incorporated into the phosphor and also to cause the sensitizer to be incorporated into the phosphor. The same coactivator can serve this dual function or different coactivators are specially selected so that they do not interefere with one another. As an example, chlorine is a good coactivator for cerium, but not for copper, and hence it cannot be used in a phosphor embodiment which incorporates both cerium and copper.

With the foregoing restrictions, the best results are obtained with calcium sulfide activated by trivalent cerium and sensitized with plumbous lead, with the coactivator being at least one of chlorine and bromine. Equivalent results are also obtained with calcium sulfide activated with trivalent cerium and sensitized with stannous tin, with a coactivator of at least one of fluorine and chlorine. Somewhat poorer results are obtained with calcium sulfide activated by trivalent cerium and sensitized with cuprous copper, with a fluorine coactivator. The following are specific examples for preparing the present phosphor.

EXAMPLE I 72 grams of phosphor grade calcium sulfide are mixed with 188 milligrams of $Ce_2S_3$, 80 milligrams of $Cu_2S$, and 780 milligrams of $CaF_2$. The cerium in the foregoing mixture constitutes 0.001 gram-atom per gram-mole of calcium sulfide, the copper constitutes 0.001 gram-atom per gram-mole of calcium sulfide, and the fluorine constitutes 0.02 gram-atom per gram-mole of calcium sulfide. The foregoing constituents are thoroughly mixed with 5 grams of pure sulfur, and then fired in a capped silica tube surrounded by a protective inert atmosphere such as argon, with the firing temperature being 1200°C maintained for 2 hours.

EXAMPLE II 72 grams of calcium sulfide are mixed with 94 milligrams of $Ce_2S_3$ (0.0005 gram-atom of cerium), 750 milligrams of SnS (0.005 gram-atom Sn), 390 milligrams $CaF_2$ (0.01 gram-atom of fluorine), and 540 milligrams ammonium chloride (0.01 gram-atom of chlorine). The foregoing mixture is mixed with 5 grams of pure sulfur and then fired as in Example I.

EXAMPLE III 72 grams of pure calcium sulfide are mixed with 188 milligrams $Ce_2S_3$ (0.001 gram-atom of cerium), 239 milligrams of PbS (0.001 gram-atom of lead) and 1.08 grams ammonium chloride (0.02 gram-atom of chlorine). The foregoing mixture is thoroughly mixed with 5 grams of pure sulfur and fired as in Example I.

Due to the firing conditions, the cerium in the phosphor is in the trivalent state, the tin sensitizer is in the stannous state, the lead sensitizer is in the plumbous state, and the copper sensitizer is in the cuprous state.

The lead sensitizer can be used in amounts of from about $10^{-6}$ to $10^{-2}$ gram-atom per gram-mole of calcium sulfide matrix and the preferred lead concentration is approximately $10^{-3}$ gram-atom per gram-mole of sulfide. The tin can be used in amounts of from $10^{-5}$ to $10^{-1}$ gram-atom per gram-mole of calcium sulfide matrix, with the preferred tin concentration being about $5 \times 10^{-3}$ gram-atom. The copper can be used in amounts of from $10^{-5}$ to $5 \times 10^{-3}$ gram-atom per gram-mole of calcium sulfide matrix, with the preferred copper concentration being about $10^{-3}$ gram-atom. The cerium activator can be present in amounts of from about $10^{-5}$ to $10^{-2}$ gram-atom per gram-mole of calcium sulfide, and the preferred cerium concentration is about $10^{-3}$ gram-atom per gram-mole of matrix.

The coactivator is included in the phosphor in gram-atom amount which is at least equal to the total gram-atoms of cerium activator plus sensitizer in the phosphor. The coactivator can be present in greater amount, however, if desired.

With a calcium sulfide phosphor activated by trivalent cerium with no sensitizer included, the quantum efficiency of the phosphor under 365 nm excitation is less than 1%. When the same phosphor is sensitized with stannous tin, the quantum efficiency of the phosphor under this excitation is about 57% and with a plumbous lead sensitizer, the quantum efficiency of the phosphor under 365 nm excitation is about 56%. With a cuprous copper sensitizer, the quantum efficiency of this phosphor under 365 nm excitation is about 12%. The foregoing enhanced response of the phosphor for long wavelengths of ultraviolet excitation increases the utility of the phosphor for applications where such excitation is available, an example being a high-pressure mercury vapor discharge device which is desired to be color corrected by incorporating a phosphor coating on the outer envelope. Such a lamp is generally described in U.S. Pat. No. 2,748,303, dated May 29, 1956.

I claim as my invention:

1. A phosphor composition which is responsive both to short wavelength and long wavelength ultraviolet excitation to produce visible radiations, said phosphor composition having a calcium sulfide matrix and activated by trivalent cerium in amount of from about $10^{-5}$ to $10^{-2}$ gram-atom per gram-mole of said phosphor matrix, and said phosphor is both sensitized and coactivated by one of the combination of:
   a. cuprous copper sensitizer in amount of from about $10^{-5}$ gram-atom to $5 \times 10^{-3}$ gram-atom per gram-mole of said sulfide matrix plus fluorine as coactivator,
   b. stannous tin sensitizer in amount of from about $10^{-5}$ to $10^{-1}$ gram-atom per gram-mole of said sulfide matrix plus at least one of fluorine and chlorine as coactivator, and
   c. plumbous lead sensitizer in amount of from about $10^{-6}$ to $10^{-2}$ gram-atom per gram-mole of said sulfide matrix plus at least one of chlorine and bromine as coactivator, said coactivator is present in gram-atom amount at least equal to the total gram-atoms of said cerium activator plus said sensitizer in said phosphor, and said coactivator having been included in the raw mix used to prepare said phosphor as a salt free from any alkali metal.

2. The phosphor composition as specified in claim 1, wherein said cerium activator is present in amount of about $10^{-3}$ gram-atom per gram-mole of said sulfide matrix, said cuprous copper sensitizer is present in amount of about $10^{-3}$ gram-atom per gram-mole of said sulfide matrix, said stannous tin sensitizer is present in amount of about $5 \times 10^{-3}$ gram-atom per gram-mole of said sulfide matrix, and said plumbous lead sensitizer is present in amount of about $10^{-3}$ gram-atom per gram-mole of said sulfide matrix.

* * * * *